(12) United States Patent
Farone et al.

(10) Patent No.: US 8,664,284 B2
(45) Date of Patent: Mar. 4, 2014

(54) DEPOLYMERIZATION OF POLYMERS

(76) Inventors: William A Farone, Irvine, CA (US); Tracy Palmer, Temecula, CA (US)

(*) Notice: Subject to any disclaimer, the term of this patent is extended or adjusted under 35 U.S.C. 154(b) by 168 days.

(21) Appl. No.: 12/624,757

(22) Filed: Nov. 24, 2009

(65) Prior Publication Data

US 2010/0144911 A1  Jun. 10, 2010

Related U.S. Application Data

(60) Provisional application No. 61/118,575, filed on Nov. 28, 2008.

(51) Int. Cl.
*C08J 11/04* (2006.01)

(52) U.S. Cl.
USPC ............ 521/44.5; 521/40; 521/40.5; 521/41; 528/480; 528/481; 528/497; 528/502 C

(58) Field of Classification Search
USPC ........ 521/40, 40.5, 41, 41.5, 42, 42.5, 43, 44, 521/44.5, 45.5; 528/480, 481, 483, 487, 528/490, 497, 501, 502 R, 502 C, 502 E, 528/502 F, 503; 241/2, 5, 15
See application file for complete search history.

(56) References Cited

U.S. PATENT DOCUMENTS

| | | | |
|---|---|---|---|
| 4,104,205 A | 8/1978 | Novotay et al. | |
| 5,284,625 A | 2/1994 | Isayev et al. | |
| 5,602,186 A | 2/1997 | Myers et al. | |
| 5,891,926 A | 4/1999 | Hunt et al. | |
| 6,380,269 B1 | 4/2002 | Benko et al. | |
| 6,548,560 B1* | 4/2003 | Kovalak et al. | 521/41 |
| 6,680,110 B1* | 1/2004 | Deeb et al. | 428/327 |
| 2009/0203807 A1* | 8/2009 | Hough et al. | 521/41 |

FOREIGN PATENT DOCUMENTS

WO  WO 2007/093782  * 8/2007

* cited by examiner

*Primary Examiner* — Frances Tischler
(74) *Attorney, Agent, or Firm* — C H O'Donohue

(57) ABSTRACT

A method of depolymerizing formulated rubbers and polymer solids is described. The method utilizes a solvent at or above the solvent's critical pressure and critical temperature with a low ratio of solvent to the solid material. The resulting depolymerized material in either substantially solid or highly viscous liquid form can be repolymerized with the addition of more monomer.

8 Claims, 1 Drawing Sheet

S-1 Crumb Storage
C-1 Crumb Conveyor
R-1 Reactor
T-1 Solvent Tank
P-1 Solvent Pump
T-2 Gas Vent Storage
B-1 Boiler
B-2 Oil Reboiler
P-2 Oil Pump
P-3 Product Pump
D-1 Product Dryer
C-2 Screw Conveyor
S-2 Product Storage

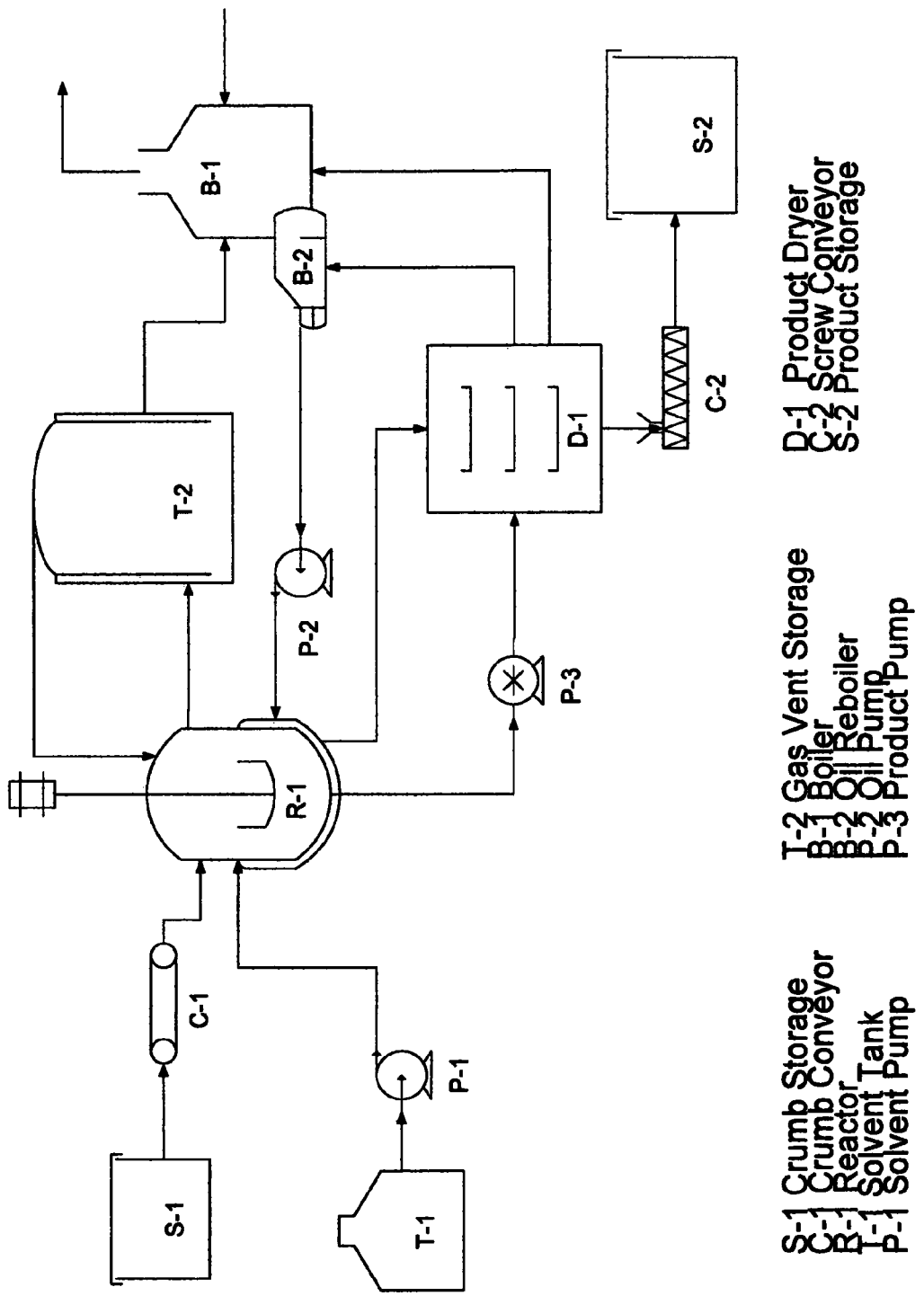

DEPOLYMERIZATION OF POLYMERS

CROSS REFERENCE TO RELATED APPLICATIONS

This application claims priority of U.S. Provisional Application No. 61/118,575 filed Nov. 28, 2008, the contents of which are incorporated fully by reference.

FIELD OF THE INVENTION

The present invention concerns a method of depolymerizing formulated rubbers and polymer solids. In one aspect the method utilizes a solvent at or above the solvent's critical pressure and critical temperature with a low ratio of solvent to the solid material. In other aspects the solvent is substantially recovered in high yield from the reaction for reuse or with minor amounts of solvent as fuel for the heating process. The resulting depolymerized material in either substantially solid or highly viscous liquid form can be repolymerized with the addition of more monomer.

DEVULCANIZATION TECHNOLOGIES

Devulcanization is a method for recycling waste tire rubber. Depolymerization of plastics is an analogous method for recovering polymer materials for recycling material in making plastics. The depolymerized polymers and devulcanized rubbers are considered valuable form of waste since these materials can be reprocessed into useful products. Generally devulcanization is done by chemical means, ultrasonic waves, microwaves, biological, or mechanical means such as steam. Typically these processes, except for ultrasonic and microwaves, only treat the surface of the particles. All of these processes incur high costs of production.

There are millions of used and worn out formulated rubber products and polymer solids discarded and filling the landfills annually. Some limited uses have been found for items such as tires which are used in building retaining walls, guards for protecting boats, gardening containers, and similar applications.

Devulcanization offers the advantage of rendering the rubber suitable for being reformulated and recured into new rubber articles. The recycled rubber could again be used for its original intended purpose rather than simply as a filler in applications such as incorporation into asphalt for surfacing roads or parking lots. However, to the present time, no devulcanization technique has proven to be commercially viable on a large scale.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300.degree. C. or where thermal cracking of the rubber is initiated.

U.S. Pat. No. 5,891,926, also discloses a process for devulcanizing cured rubber into devulcanized rubber that is capable of being recompounded and recured into useful rubber products, and for extracting the devulcanized rubber from the cured rubber, said process comprising (1) heating the cured rubber to a temperature which is within the range of about 150.degree C. to about 300 degree C. under a pressure of at least about $3.4 \times 10^6$ Pascals in 2-butanol to devulcanize the cured rubber into the devulcanized rubber thereby producing a mixture of solid cured rubber, solid devulcanized rubber and a solution of the devulcanized rubber in the 2-butanol, (2) removing the solution of the devulcanized rubber from the solid cured rubber and the solid devulcanized rubber, (3) cooling the solution of the devulcanized rubber in the 2-butanol to a temperature of less than about 100 degree. C. and (4) separating the devulcanized rubber from the 2-butanol.

U.S. Pat. No. 6,380,0269 discloses a process for devulcanizing the surface of reclaimed rubber crumb wherein the rubber crumb has first been reduced to a particle size which is within the range of about 325 mesh to about 20 mesh. This reduction can be accomplished by any mechanical means. The rubber crumb is heated under pressure in the presence of 2-butanol producing a slurry of surface devulcanized rubber crumb in 2-butanol under an inert gas atmosphere, such as nitrogen. The reclaimed rubber crumb is then separated from the 2-butanol and the butanol is discarded. Other alcohols were used in further examples.

The present invention involves a novel solution to the problem of devulcanizing rubber and depolymerizing polymer solids wherein the solvent used in the process is recovered mainly for reuse or in minor amounts as a fuel for the process. After an initial process to remove steel and nylon and commutation to produce tire crumb, supercritical hexane is used to convert recycled tires to a butyl rubber type product that is useful for incorporation into new tires or other rubber products. Further this instant invention utilizes a solvent at a lower ratio of solvent to material than previously found possible and with a solvent that is recovered for additional use. Further the process has been extended to a wide variety of other polymers.

DEFINITIONS

The term, 'polymer solids', refers to materials produced as a function of the polymerization of monomer units.

The term, 'tire crumb' refers to materials made from used tires after removal of steel and nylon and in which the added sulfur, ZnO, carbon, silica is still present and ground to a granule.

The term, 'psia', refers to pressure in pounds per square inch where 14.7 psia is atmospheric pressure.

ABBREVIATIONS

EPDM ethylene propylene diene M-class
TPE thermoplastic elastomer polymers
SBR synthetic butyl rubber
Neoprene polychloroprene All publications, including patents, published patent applications, scientific or trade publications and the like, cited in this specification are hereby incorporated herein in their entirety.

BRIEF DESCRIPTION OF THE DRAWING

FIG. 1 is a block diagram of a depolymerization process for polymers according to the instant invention.

DETAILED DESCRIPTION

The present invention is drawn generally to a method wherein supercritical hexane is utilized to convert polymer solids or recycled tires after the removal of steel and nylon from the recycled tires to a rubber type product that can be used for incorporation into new tires or other polymer solid products. Utilization of an inexpensive solvent with the only waste produced being boiler flue gas, the process as described and as illustrated in FIG. 1 is thus relatively inexpensive method to produce a high value product from waste materials.

The material to be devulcanized or depolymerized is conveyed to a reactor (R-1) from a storage bin (S-1). The solvent is conveyed from a tank (T-1) into the reactor. In a further aspect the solvent is n-hexane. An additional embodiment the ratio of solvent to material is 1:4 to 1:10. In a further aspect the ratio of solvent to material is 1:8.

The temperature of the solvent and polymer solids in the reactor is increased until the temperature and/or pressure in the reactor exceeds the condition wherein the solvent becomes supercritical. In one embodiment the solvent is n-hexane and the temperature is between at least 234 degrees C. and about 400 degrees C. In a further implementation the temperature is between about 250 degrees C. and about 300 degrees C.

In an implementation the pressure is between at least 436 psia and about 550 psia. In an another implementation the pressure is between 440 psia and about 525 psia. In an additional aspect the solvent is flashed off the reaction mixture at about 300 psia into a storage vessel (T-2).

An additional implementation the polymer solid is selected from the group consisting of tire crumb, compounded rubber, ethylene propylene diene M-class, thermoplastic elastomer polymers, synthetic butyl rubber, and polychloropene. In a further aspect the tire crumb has a size between about 80 mesh and about 150 mesh.

The reactor is held at supercritical conditions for about 30 minutes after the vessel and material have reached temperature. No agitation is required but a slight agitation is useful to reduce the reaction time and to assist in the removal of the finished product.

Upon completion of the reaction the vapor in the reactor is flashed off into a storage vessel (T-2). In one implementation the storage vessel is approximately five times larger than the reactor. Cooling will cause the solvent in the storage vessel to partially condense and it can be subsequently recovered. The recovered solvent can then be reused in the process. In a further aspect the amount of solvent left in the product can be adjusted to make a highly viscous but flowable devulcanized rubber. An additional implementation the flowable highly viscous liquid is removed by a pump such as a progressive cavity pump (P-3) to a screw conveyor (C-2).

In another implementation a relatively dry cake or material is desired for further processing. The product is sent to a dryer (D-1) wherein more solvent is removed. In a further aspect the dryer air with the solvent vapors along with residual vapors from storage vessel containing the flashed off solvent are used to provide the combustion air to the boiler (B-1). This method of recycling provides for a waste stream that is utilized leaving only flue gas as a waste.

The final product, either the viscous liquid or the dry material can be stored or packed directly for shipment.

Example A

There was 8 lbs. of tire crumb loaded into the 5 gallon reactor by hand and one lb. of n-hexane was added. The reactor was sealed and there was no stirring during the reaction. After 4 hours and 40 minutes the pressure had reached 455 psia with a temperature of 360° C. The supercritical parameters are 234° C. and 436 psia. The reaction was shut down and cooled overnight. The pressure in the reactor dropped to 45 psia by the following morning. The sample was vented to the storage vessel. There was 8.8 lbs of material removed from the reactor which included residual hexane. The storage vessel contained hexane.

Example B

There was 16 lbs. of tire crumb rubber loaded into the 5 gallon reactor by hand and two lbs. of n-hexane was added. The reactor was sealed and there was no stirring during the reaction. After 3 hours the pressure had reached 581 psia with a temperature of 392° C. The reaction was shut down and allowed to cool. When the pressure in the reactor reached 300 psia the hexane was flashed over to the 25 gallon storage vessel and the system reached a pressure of about 50 psia. The storage vessel served the purpose of reducing the pressure immediately and it was 5 times the volume of the reactor so that the pressure dropped to about ⅕ of the total value. Over 80% of the hexane was recovered in the storage vessel. This hexane was available for reuse. The devulcanized tire crumb was removed and dried in a vacuum dryer.

Example C

There was 8 lbs. of truck tire crumb loaded into the reactor by hand and one lb. of n-hexane was added. The reactor was sealed and there was no stirring during the reaction. After 4 hours and 45 minutes the pressure had reached 484 psia with a temperature of 376° C. The reaction was shut down. As in Example A and B the reaction was flashed to the storage vessel. The storage vessel contained hexane

Example D

There was 6.9 lbs. of EDPM loaded into the reactor by hand and 0.9 lbs. of n-hexane was added. The reactor was sealed and there was no stirring during the reaction. After 5 hours and 30 minutes the pressure had reached 250 psia with a temperature of 362° C. As in the preceding examples the solvent was flashed from the reaction mixture and the depolymerized polymer was removed for further studies The materials produced in the above examples and other similar reactions were sent to outside specialty laboratories and used as part of a formulation for new rubber and tire products. The depolymerized material was determined to perform satisfactorily as a substitute for 5% up to 30% of new monomer.

Example E

From a storage bin 16 pounds of tire crumb is conveyed to a 5 gal. pressure reactor. Two pounds of n-hexane is pumped to the reactor. The reactor is sealed and is heated to 276 degrees C. at 500 psia. After approximately 30 minutes with slight agitation to the mixture in the reactor, the vapors are flashed off into a 25 gal. storage vessel and the total pressure of the system in the reactor becomes approximately 50 psia. Cooling in the storage vessel causes the hexane to partially condense and approximately 1.7 pounds of liquid n-hexane are recovered. This liquid can then be reused in the process. Approximately 15.9 pounds of devulcanized tire crumb is recovered. The trace of residual hexane in the tire crumb cake is removed by drying. The dryer air with the n-hexane vapors along with the residual vapors from the storage vessel are used to provide the combustion air along with additional fuel to the boiler which is typically natural gas. Both the reactor and the dryer are heated by a heat exchange fluid that is heated by the boiler.

For a flowable highly viscous rubber material, more solvent is left in the products/

While this invention has been described with respect to various specific examples and embodiments, it is to be understood that the invention is not limited thereto and that it can be variously practiced with the scope of the following claims.

We claim:

1. A method of reducing a polymer solid selected from the group consisting of tire crumb, compounded rubber, ethylene propylene diene M-class, thermoplastic elastomer polymers, synthetic butyl rubber, and polychloropene to a state wherein the polymer solid can be repolymerized with the addition of more monomer, the method comprising the steps of:

placing the polymer solid and n-hexane in a reactor where the weight ratio of polymer solid to n-hexane is at least 4:1;

heating the polymer solid in the presence of n-hexane below a pressure of 1000 psia and above the critical temperature of the n-hexane and maintaining pressure and temperature for a sufficient time to cause significant depolymerization of the polymer solid such that monomeric bonding can occur on the surface of depolymerized polymer when it is reused;

reducing the temperature and pressure to below the supercritical conditions for the n-hexane;

flashing the n-hexane and other by-products into a receiving vessel and at least partially condensing the solvent to collect the n-hexane in high yield for reuse;

removing remainder of the n-hexane by evaporation wherein the n-hexane is collected for reuse or as fuel for heating process; and recovering the depolymerized polymer in a substantially solid or highly viscous liquid form for reuse in producing more polymer wherein the heating and maintaining steps are conducted with little or no agitation.

2. The method according to claim 1 wherein the polymer solid is vulcanized rubber in the form of tire crumb.

3. The method according to claim 1 wherein the temperature is between at least 234° C. and about 400° C.

4. The method according to claim 3 wherein the temperature is between about 250° C. and about 300° C.

5. The method according claim 1 wherein the pressure is between at least 436 psia and about 550 psia.

6. The method according to claim 5 wherein the pressure is between 440 psia and about 525 psia.

7. The method according to claim 1 wherein said flashing of the solvent occurs at about 300 psia.

8. The method according to claim 2 wherein the tire crumb have a size between about 80 and about 150 mesh.

* * * * *